(12) United States Patent
Headley et al.

(10) Patent No.: US 8,536,976 B2
(45) Date of Patent: Sep. 17, 2013

(54) SINGLE-CHANNEL MULTI-FACTOR AUTHENTICATION

(75) Inventors: Paul Headley, Hollister, CA (US); Kevin Collins, Goodyear, AZ (US)

(73) Assignee: Veritrix, Inc., Palo Alto, CA (US)

( * ) Notice: Subject to any disclaimer, the term of this patent is extended or adjusted under 35 U.S.C. 154(b) by 1362 days.

(21) Appl. No.: 12/137,129

(22) Filed: Jun. 11, 2008

(65) Prior Publication Data
US 2009/0309698 A1    Dec. 17, 2009

(51) Int. Cl.
*G06F 7/04* (2006.01)

(52) U.S. Cl.
USPC .......................... 340/5.2; 340/5.82; 382/115

(58) Field of Classification Search
USPC .................. 340/5.2, 5.1, 1.1, 5.8, 5.81–5.85; 382/115, 116, 118, 124; 902/3, 6
See application file for complete search history.

(56) References Cited

U.S. PATENT DOCUMENTS

| | | | |
|---|---|---|---|
| 5,033,088 A | 7/1991 | Shipman | |
| 5,805,674 A * | 9/1998 | Anderson, Jr. | 379/93.03 |
| 5,824,030 A | 10/1998 | Yang et al. | |
| 5,841,870 A | 11/1998 | Fieres et al. | |
| 5,915,001 A | 6/1999 | Uppaluru | |
| 5,958,016 A | 9/1999 | Chang et al. | |
| 5,995,928 A | 11/1999 | Nguyen et al. | |
| 6,009,442 A | 12/1999 | Chen et al. | |
| 6,061,651 A | 5/2000 | Nguyen | |
| 6,119,087 A | 9/2000 | Kuhn et al. | |
| 6,173,266 B1 | 1/2001 | Marx et al. | |
| 6,233,556 B1 | 5/2001 | Teunen et al. | |
| 6,256,030 B1 | 7/2001 | Berry et al. | |
| 6,262,732 B1 | 7/2001 | Coleman et al. | |
| 6,266,398 B1 | 7/2001 | Nguyen | |
| 6,272,484 B1 | 8/2001 | Martin et al. | |
| 6,292,767 B1 | 9/2001 | Jackson et al. | |
| 6,389,394 B1 | 5/2002 | Fanty | |
| 6,393,399 B1 | 5/2002 | Even | |
| 6,400,806 B1 | 6/2002 | Uppaluru | |
| 6,405,170 B1 | 6/2002 | Phillips et al. | |
| 6,424,943 B1 | 7/2002 | Sherwood et al. | |
| 6,434,521 B1 | 8/2002 | Barnard | |
| 6,434,523 B1 | 8/2002 | Monaco | |

(Continued)

FOREIGN PATENT DOCUMENTS

| | | |
|---|---|---|
| CA | 2278549 A1 | 7/1998 |
| CA | 2399961 A1 | 4/1999 |
| WO | 0156352 A2 | 8/2001 |

OTHER PUBLICATIONS

U.S. Appl. No. 12/166,792, Paul Headley, Systems and Methods for Controlling Access to Encrypted Data Stored on a Mobile Device, Jul. 2, 2008.

(Continued)

*Primary Examiner* — Brian Zimmerman
*Assistant Examiner* — Sara Samson
(74) *Attorney, Agent, or Firm* — Peters Verny, LLP

(57) ABSTRACT

Systems and methods for authenticating electronic transactions are provided. The authentication methods employ a combination of security features. These security features can be based, for example, on unique knowledge of the person being authenticated, unique personal features and attributes of the person, the ability of the person to respond, and to do so in a fashion that a machine cannot, and so forth. Methods for enrolling the person prior to authentication are also provided, as well as systems for enrollment and authentication.

23 Claims, 5 Drawing Sheets

(56) References Cited

U.S. PATENT DOCUMENTS

| | | |
|---|---|---|
| 6,446,210 B1 | 9/2002 | Borza |
| 6,456,972 B1 | 9/2002 | Gladstein et al. |
| 6,480,304 B1 | 11/2002 | Os et al. |
| 6,480,825 B1 | 11/2002 | Sharma et al. |
| 6,487,532 B1 | 11/2002 | Schoofs et al. |
| 6,490,549 B1 | 12/2002 | Ulicny et al. |
| 6,496,206 B1 | 12/2002 | Mernyk et al. |
| 6,496,595 B1 | 12/2002 | Puchek et al. |
| 6,501,833 B2 | 12/2002 | Phillips et al. |
| 6,501,966 B1 | 12/2002 | Bareis et al. |
| 6,519,561 B1 | 2/2003 | Farrell et al. |
| 6,519,562 B1 | 2/2003 | Phillips et al. |
| 6,529,885 B1 | 3/2003 | Johnson |
| 6,535,849 B1 | 3/2003 | Pakhomov et al. |
| 6,535,851 B1 | 3/2003 | Fanty et al. |
| 6,560,576 B1 | 5/2003 | Cohen et al. |
| 6,567,778 B1 | 5/2003 | Chao Chang et al. |
| 6,570,964 B1 | 5/2003 | Murveit et al. |
| 6,581,042 B2 | 6/2003 | Pare, Jr. et al. |
| 6,601,027 B1 | 7/2003 | Wright et al. |
| 6,606,594 B1 | 8/2003 | Sejnoha et al. |
| 6,606,598 B1 | 8/2003 | Holthouse et al. |
| 6,629,066 B1 | 9/2003 | Jackson et al. |
| 6,629,075 B1 | 9/2003 | Schalkwyk |
| 6,647,363 B2 | 11/2003 | Claassen |
| 6,665,641 B1 | 12/2003 | Coorman et al. |
| 6,671,672 B1 | 12/2003 | Heck |
| 6,697,947 B1 | 2/2004 | Matyas, Jr. et al. |
| 6,704,703 B2 | 3/2004 | Ferhaoui et al. |
| 6,728,677 B1 | 4/2004 | Kannan et al. |
| 6,742,161 B1 | 5/2004 | James et al. |
| 6,766,295 B1 | 7/2004 | Murveit et al. |
| 6,778,644 B1 | 8/2004 | Jenkins et al. |
| 6,785,365 B2 | 8/2004 | Nguyen |
| 6,785,653 B1 | 8/2004 | White et al. |
| 6,789,062 B1 | 9/2004 | Phillips et al. |
| 6,804,640 B1 | 10/2004 | Weintraub et al. |
| 6,804,647 B1 | 10/2004 | Heck et al. |
| 6,810,404 B1 | 10/2004 | Ferguson et al. |
| 6,819,219 B1 | 11/2004 | Bolle et al. |
| 6,820,094 B1 | 11/2004 | Ferguson et al. |
| 6,839,669 B1 | 1/2005 | Gould et al. |
| 6,856,957 B1 | 2/2005 | Dumoulin |
| 6,856,975 B1 * | 2/2005 | Inglis ................ 705/51 |
| 6,859,776 B1 | 2/2005 | Cohen et al. |
| 6,862,570 B2 | 3/2005 | Schalkwyk |
| 6,873,953 B1 | 3/2005 | Lennig |
| 6,885,736 B2 | 4/2005 | Uppaluru |
| 6,886,095 B1 | 4/2005 | Hind et al. |
| 6,907,408 B2 | 6/2005 | Angel |
| 6,912,498 B2 | 6/2005 | Stevens et al. |
| 6,934,858 B2 | 8/2005 | Woodhill |
| 6,959,167 B1 | 10/2005 | Dehandschutter |
| 6,961,704 B1 | 11/2005 | Phillips et al. |
| 6,988,069 B2 | 1/2006 | Phillips |
| 6,993,166 B2 | 1/2006 | Lo et al. |
| 7,003,456 B2 | 2/2006 | Gillick et al. |
| 7,058,573 B1 | 6/2006 | Murveit et al. |
| 7,069,221 B2 | 6/2006 | Crane et al. |
| 7,072,838 B1 | 7/2006 | Ghosh et al. |
| 7,085,840 B2 | 8/2006 | De Jong et al. |
| 7,149,688 B2 | 12/2006 | Schalkwyk |
| 7,171,694 B1 | 1/2007 | Jespersen et al. |
| 7,216,079 B1 | 5/2007 | Barnard et al. |
| 7,240,363 B1 | 7/2007 | Ellingson |
| 7,277,891 B2 | 10/2007 | Howard et al. |
| 7,305,700 B2 | 12/2007 | Boynton et al. |
| 7,319,987 B1 | 1/2008 | Hoffman et al. |
| 7,333,635 B2 | 2/2008 | Tsantes et al. |
| 7,334,259 B2 | 2/2008 | Haala |
| 7,349,557 B2 | 3/2008 | Tibor |
| 7,352,868 B2 | 4/2008 | Hawkes et al. |
| 7,383,572 B2 | 6/2008 | Rolfe |
| 7,461,258 B2 | 12/2008 | Rolfe |
| 7,571,100 B2 | 8/2009 | Lenir et al. |
| 7,580,838 B2 | 8/2009 | Divay et al. |
| 7,584,102 B2 | 9/2009 | Hwang et al. |
| 7,617,522 B2 | 11/2009 | Schmidt et al. |
| 7,634,662 B2 | 12/2009 | Monroe |
| 7,647,498 B2 | 1/2010 | Brown et al. |
| 7,689,833 B2 | 3/2010 | Lange |
| 7,788,730 B2 | 8/2010 | Dean et al. |
| 7,797,545 B2 | 9/2010 | Adams et al. |
| 7,987,495 B2 * | 7/2011 | Maler et al. ................ 726/1 |
| 7,997,972 B2 | 8/2011 | Nguyen et al. |
| 8,006,291 B2 | 8/2011 | Headley et al. |
| 8,166,297 B2 | 4/2012 | Headley |
| 8,185,646 B2 | 5/2012 | Headley |
| 8,347,370 B2 | 1/2013 | Headley |
| 2002/0129251 A1 | 9/2002 | Itakura et al. |
| 2002/0152179 A1 | 10/2002 | Racov |
| 2002/0174347 A1 | 11/2002 | Ting |
| 2003/0005326 A1 | 1/2003 | Flemming |
| 2003/0046541 A1 | 3/2003 | Gerdes et al. |
| 2003/0140235 A1 | 7/2003 | Immega et al. |
| 2003/0163739 A1 | 8/2003 | Armington et al. |
| 2003/0236978 A1 | 12/2003 | Evans et al. |
| 2004/0085162 A1 | 5/2004 | Agarwal et al. |
| 2004/0158723 A1 | 8/2004 | Root |
| 2005/0091338 A1 | 4/2005 | de la Huerga |
| 2005/0114705 A1 | 5/2005 | Reshef et al. |
| 2005/0267766 A1 | 12/2005 | Galbreath et al. |
| 2006/0005033 A1 | 1/2006 | Wood |
| 2006/0021009 A1 | 1/2006 | Lunt |
| 2006/0041755 A1 | 2/2006 | Pemmaraju |
| 2006/0106734 A1 | 5/2006 | Hoffman et al. |
| 2006/0129821 A1 | 6/2006 | Zugenmaier et al. |
| 2006/0136219 A1 * | 6/2006 | Wang ................ 704/273 |
| 2006/0136744 A1 | 6/2006 | Lange |
| 2006/0184369 A1 | 8/2006 | Levonas |
| 2006/0184800 A1 | 8/2006 | Rosenberg |
| 2006/0212717 A1 | 9/2006 | Ito et al. |
| 2006/0245619 A1 * | 11/2006 | Sathath ................ 382/115 |
| 2007/0022301 A1 | 1/2007 | Nicholson et al. |
| 2007/0055517 A1 | 3/2007 | Spector |
| 2007/0061590 A1 * | 3/2007 | Boye et al. ................ 713/186 |
| 2007/0107016 A1 | 5/2007 | Angel et al. |
| 2007/0107017 A1 | 5/2007 | Angel et al. |
| 2007/0107021 A1 | 5/2007 | Angel et al. |
| 2007/0169182 A1 | 7/2007 | Wolfond et al. |
| 2007/0175986 A1 | 8/2007 | Petrone et al. |
| 2007/0186106 A1 | 8/2007 | Ting et al. |
| 2007/0198435 A1 | 8/2007 | Siegal et al. |
| 2007/0226516 A1 | 9/2007 | Kubota et al. |
| 2007/0226787 A1 | 9/2007 | Malefsky et al. |
| 2008/0004876 A1 | 1/2008 | He et al. |
| 2008/0052527 A1 | 2/2008 | Siedlarz |
| 2008/0059498 A1 | 3/2008 | Carus et al. |
| 2008/0077405 A1 | 3/2008 | Breuer |
| 2008/0077406 A1 | 3/2008 | Ganong, III |
| 2008/0077524 A1 | 3/2008 | Greene |
| 2008/0077525 A1 | 3/2008 | Willey et al. |
| 2008/0077526 A1 | 3/2008 | Arumugam |
| 2008/0086319 A1 | 4/2008 | Berger |
| 2008/0086764 A1 | 4/2008 | Kulkarni et al. |
| 2008/0091618 A1 | 4/2008 | Obrea et al. |
| 2008/0113786 A1 | 5/2008 | Alderucci et al. |
| 2008/0141353 A1 * | 6/2008 | Brown ................ 726/7 |
| 2008/0187121 A1 | 8/2008 | Agarwal et al. |
| 2009/0052745 A2 * | 2/2009 | Sathath ................ 382/115 |
| 2009/0116703 A1 * | 5/2009 | Schultz ................ 382/118 |
| 2009/0119290 A1 | 5/2009 | Rhodes |
| 2009/0259588 A1 * | 10/2009 | Lindsay ................ 705/40 |
| 2009/0309698 A1 | 12/2009 | Headley et al. |
| 2009/0313165 A1 * | 12/2009 | Walter ................ 705/41 |
| 2010/0005296 A1 | 1/2010 | Headley |
| 2010/0029196 A1 | 2/2010 | Tan |
| 2010/0107230 A1 | 4/2010 | Tyagi et al. |
| 2010/0115114 A1 | 5/2010 | Headley |
| 2010/0146604 A1 | 6/2010 | Piccionelli |
| 2011/0209200 A2 | 2/2011 | White et al. |
| 2011/0231911 A1 | 9/2011 | White et al. |
| 2011/0302644 A1 | 12/2011 | Headley |
| 2011/0302645 A1 | 12/2011 | Headley |

OTHER PUBLICATIONS

U.S. Appl. No. 12/942,248, Paul Headley, Methods for Identifying the Guarantor of an Application, Nov. 9, 2010.
U.S. Appl. No. 13/211,230, Paul Headley, Methods for the Secure Use of One-Time Passwords, Aug. 16, 2011.
U.S. Appl. No. 13/213,029, Paul Headley, Multi-Channel Multi-Factor Authentication, Aug. 18, 2011.
U.S. Appl. No. 13/213,035, Paul Headley, Multi-Channel Multi-Factor Authentication, Aug. 18, 2011.
U.S. Appl. No. 12/608,190, Paul Headley, User Authentication for Social Networks, Oct. 29, 2009.
International Search Report and Written Opinion, PCT/US09/43363 (May 8, 2009), dated Jul. 16, 2009.
International Search Report and Written Opinion, PCT/US09/47049 (Jun. 11, 2009), dated Sep. 1, 2009.
International Search Report and Written Opinion, PCT/US09/48842 (Jun. 26, 2009), dated Aug. 3, 2009.
International Search Report and Written Opinion, PCT/US09/62490 (Oct. 29, 2009), dated Dec. 14, 2009.
U.S. Appl. No. 12/119,617 non-final Office action, mailed Dec. 29, 2010.
U.S. Appl. No. 12/119,617 Applicants' Amendment A, submitted Feb. 1, 2011.
U.S. Appl. No. 12/119,617 non-final Office action, mailed Apr. 14, 2011.
U.S. Appl. No. 12/119,617 Applicants' Amendment B, submitted Apr. 20, 2011.
U.S. Appl. No. 12/166,792 non-final Office action, mailed Sep. 27, 2011.
U.S. Appl. No. 12/166,792 Applicant's Amendment A, submitted Nov. 18, 2011.
U.S. Appl. No. 12/608,190 non-final Office action, mailed Sep. 29, 2011.
U.S. Appl. No. 12/608,190 Applicant's Amendment A, submitted Dec. 15, 2011.
Chenafa, Mohamed, et al., "Biometric System Based on Voice Recognition Using Multiclassifiers," Biometrics and Identity Management, Springer, Berlin, May 7, 2008, pp. 206-215.
EPO application 09747255.9 Extended European Search Report, Jun. 28, 2012.
Thomas et al., Learning to Predict Gender from Iris Images, Sep. 29, 2007, http://ieeexplore.ieee.org/xpls/abs_aal.jsp?arnumber=4401911&tag=1.
Jain et al., Soft Biometric Traits for Personal Recognition Systems, http://www.springerlink.com/content/5gg1c23821cevbnk/.
Ambalakat, Security of Biometric Authentication Systems, 2005, http://www.ewp.rpl.edu/hartford/~rhb/cs_seminar_2005/SessionA1/ambalakat.pdf.
EPO 09 763 627.8 European Supplementary Search Report, Dec. 30, 2011.
EPO 09 763 627.8 Communication pursuant to Rules 70(2), 70a(2) EPC, Jul. 3, 2012.

* cited by examiner

SINGLE-CHANNEL MULTI-FACTOR AUTHENTICATION

CROSS-REFERENCE TO RELATED APPLICATIONS

This application is related to U.S. patent application Ser. No. 12/119,617 filed May 13, 2008 and entitled "Multi-Channel Multi-Factor Authentication," now U.S. Pat. No. 8,006,291, which is incorporated herein by reference.

BACKGROUND OF THE INVENTION

1. Field of the Invention

The present invention relates generally to the field of authentication and more particularly to authenticating parties to electronic financial and other transactions.

2. Description of the Prior Art

Present-day commerce increasingly relies on electronic transactions, and as such, a party to a proposed transaction needs to be able to verify that the other parties to the proposed transaction are legitimate. Illegitimate other parties include hackers, those interested in perpetrating identity theft, and those interested in perpetrating fraud, to name but a few. Accordingly, various authentication methodologies have been developed to verify a party's identity prior to an electronic transaction. Unfortunately, prior art methods all have weaknesses that can be exploited or that introduce burdens on users and managing organizations.

For example, the use of a password is a common method to verify a person's identity. However, passwords can be determined through trial and error, copied from electronic communications, and learned in various ways, such as watching a person typing on a keyboard. Other forms of authentications offer higher degrees of security, but still have vulnerabilities. For instance, biometric data cannot be copied simply by looking over a person's shoulder, but can still be duplicated. Fingerprints can be lifted off of drinking glasses, biometric data can be intercepted in electronic communications, voices can be recorded, and so forth. As those seeking to defeat authentication systems become more sophisticated, new authentication systems have had to become more complex, and generally more cumbersome for the users. What is needed, therefore, is an authentication system that is simple, rapid, and secure against illegitimate use.

SUMMARY

An exemplary method for authenticating a user comprises receiving a claimant target, sending a prompt over a communication channel, receiving a biometric response to the prompt over the communication channel, and determining a match between the biometric response and a biometric template associated with the prompt. Here, the prompt is one of a plurality of prompts where each of the plurality of prompts has a biometric template of the user associated therewith. While the claimant target can comprise a user ID, other embodiments of the authentication method further comprises determining a user ID from the claimant target. The claimant target can be received over the communication channel, however, in other embodiments, the authentication method further comprises retrieving a device address associated with a user ID and establishing the communication channel using the device address. The device address can be a phone number or IP address in various embodiments.

The authentication method can also further comprise selecting the prompt from the plurality of prompts, and in some of these embodiments selecting the prompt is performed according to a rule that the same prompt is not used in successive authentications. Prompts, such as audio and video prompts, can be obscured, for example, by applying a CAPTCHA program. In some instances at least one of the prompts of the plurality of prompts comprises a personalized prompt, while in other embodiments the prompt comprises a hybrid prompt including a random word. In some of these embodiments the authentication method further comprises applying voice recognition to the random word. In some of these further embodiments the authentication method additionally comprises storing a biometric signature corresponding to the random word.

An exemplary method for authentication comprises a claimant submitting a claimant target from a device, such as a hand-held device or PC, the claimant receiving a prompt with the device, and the claimant submitting a biometric response to the prompt from the device. Some exemplary authentication methods consist of only these steps. The step of the claimant submitting the biometric response can includes speaking or facing a video camera, in some embodiments.

An exemplary authentication system comprises enrollment logic and authentication logic. Here, the enrollment logic is configured to enroll a user by associating the user with a user ID, associating a plurality of prompts with the user ID, and associating a plurality of biometric templates each with one of the plurality of prompts. The authentication logic is configured to authenticate a claimant as the user by receiving a claimant target, sending a prompt from the plurality of prompts over the communication channel, receiving a biometric response to the prompt, and determining a match between the biometric response and a biometric template associated with the prompt. The enrollment logic, in some embodiments, is further configured to associate the plurality of prompts with the user ID by presenting a set of pre-defined prompts to the user and receiving a selection of the plurality of prompts therefrom. In further embodiments, the enrollment logic is also configured to allow the user to create a personalized prompt.

Another exemplary authentication system comprises authentication logic configured to authenticate a claimant by receiving a claimant target over a communication channel, sending a prompt from a plurality of prompts over the communication channel, receiving a biometric response to the prompt, and determining a match between the biometric response and a biometric template associated with the prompt.

DETAILED DESCRIPTION

The present disclosure is directed to systems and methods for authenticating electronic transactions, such as financial transactions as well as access to sensitive or secret information like medical records, corporate business and intellectual property, and military secrets. The authentication methods described herein employ a number of security features in combination to provide authentication that is quick, convenient, and resistant to compromise. The security features can be based, for example, on unique knowledge of the user, a unique thing that the user has, unique personal features and attributes of the user, the ability of the user to respond, and to do so in a fashion that a machine cannot, that only a fraction of the authentication information is made available in any one authentication attempt, and so forth.

The methods described herein comprise an initial enrollment and subsequent authentications. In the initial enrollment process, an enrollee user is associated with a user ID and that user ID is further associated with the address of a communication device for the user. The user is also asked to provide biometric samples in response to a plurality of different prompts. The prompts and responses are also associated with the user ID. After enrollment, a person seeking to be authenticated, termed a claimant herein, first submits a claimant target which can be the user ID or some other unique identifier from which the authentication system can infer the particular identity sought to be authenticated. One of the prompts associated with the user ID is then provided to the claimant, the claimant provides a biometric response to the prompt, and that response is compared to the biometric sample previously associated with that prompt. Within this simple framework a variety of security features can be effectively employed.

One such security feature is achieved through the use of biometrics which provides security based on the uniqueness of various personal features, attributes, and behaviors such as one's fingerprint, voice, eyes, face, genetic material, scent, signature, and so forth. Another security feature can be achieved through the use of responses to prompts which require the user's unique knowledge to respond correctly. In some instance, multiple pairs of prompts and responses are stored, though only one pair need be used for any authentication attempt. In these embodiments, another security feature is realized because only a fraction of the authentication information is made available in any one authentication attempt. Still another security feature can be achieved by implementing a rule that the same prompt from the plurality of prompts cannot be used in successive authentications. This rule makes it more difficult to record the biometric response from a legitimate authentication and replay that response in a fraudulent authentication attempt. Still further security features, described in more detail below, can also be employed.

Figure 1:
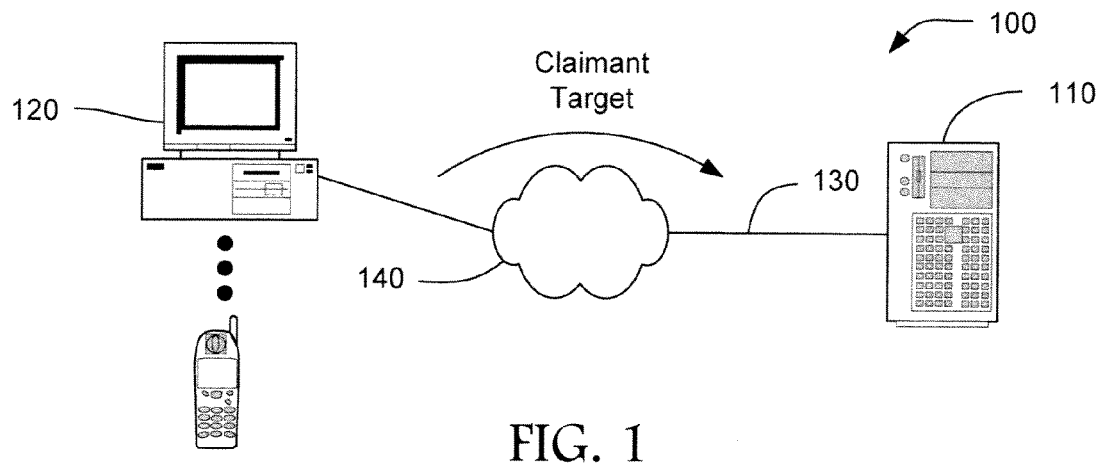
FIGS. 1-3 are schematic representations of steps of a generalized authentication method performed within an exemplary environment for carrying out the various methods described herein.

FIG. 1 shows an exemplary environment 100 for carrying out various methods described herein. The environment 100 comprises an authentication system 110 in communication with a device 120 over a communication channel 130. The authentication system 110 can comprise one or more servers, data storage devices, workstations, and the like, networked together and configured to perform the functions described herein. The authentication system 110 is preferably implemented in a secure environment to prevent both external and internal tampering. The authentication system 110 is configured to implement authentications, described generally by FIGS. 1-3 and in more detail with respect to FIG. 5, and in some embodiments the authentication system 110 is also configured to implement user enrollment. Alternatively, enrollment can be implemented by a separate system in communication with the authentication system 110. The enrollment process is described in detail with respect to FIG. 4.

Figure 2:
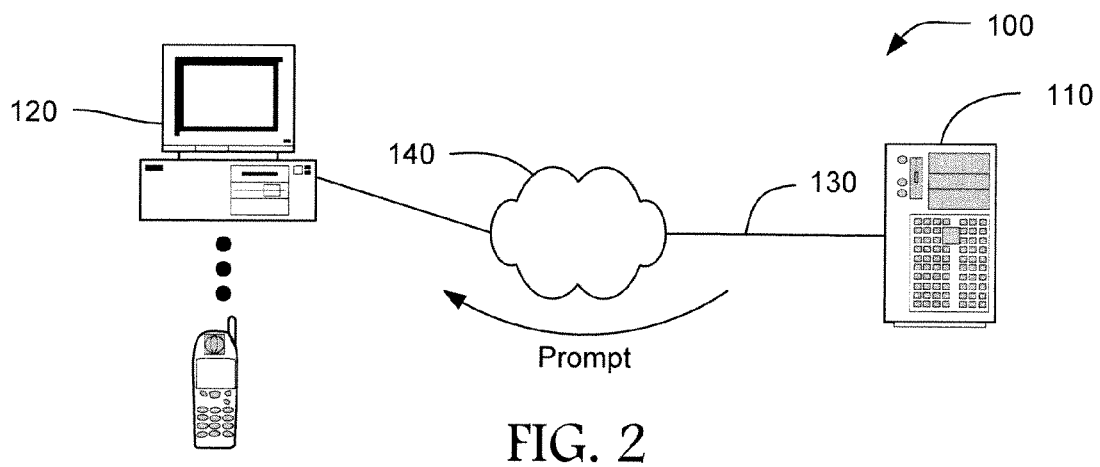
Figure 3:
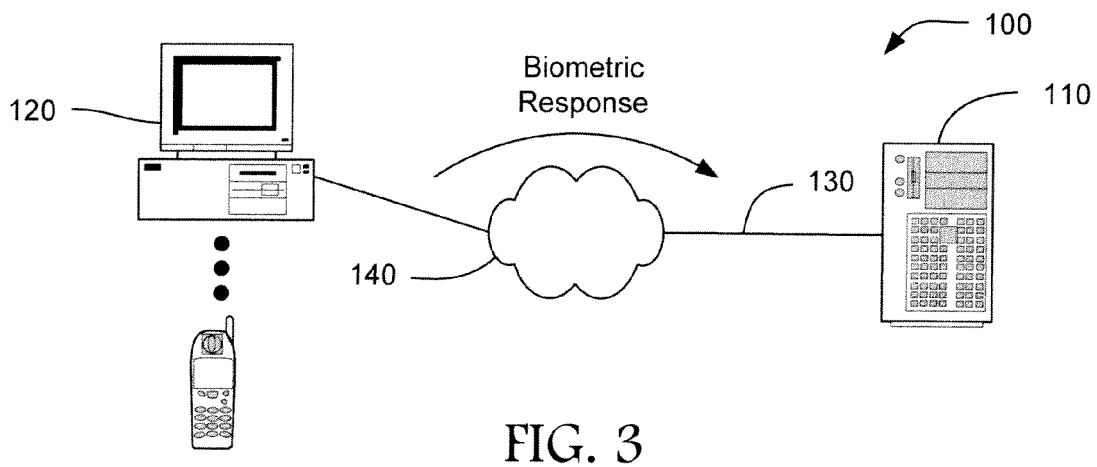

FIG. 1, in conjunction with FIGS. 2 and 3, illustrate the process of an exemplary authentication. In various embodiments, the authentication system 110 initially receives a claimant target from the device 120, as shown in FIG. 1. The authentication system 110 next sends a prompt back to the device 120 (FIG. 2), receives a biometric response from the device 120 (FIG. 3), and then compares the biometric response with the biometric sample that was previously associated with the prompt. Biometric responses, as well as biometric samples which are also referred to herein as a biometric signatures or biometric templates, are discussed in greater detail below. Upon completion of a successful authentication, the authentication system 110 may communicate the successful result to either or both of the authenticated user and other parties to a transaction. The authentication system 110 is discussed further with respect to FIG. 6.

The device 120 is a communication device that can communicate a claimant target to the authentication system 110, receive and render a prompt from the authentication system 110, and transmit a response thereto. Exemplary devices 120 include personal computers (PCs) and cell phones as illustrated in FIGS. 1-3, as well as laptops, personal digital assistants (PDAs), smart phones (such as Treos, BlackBerries, etc.), kiosks, and so forth.

The claimant target can simply be, for example, the user ID associated with the user during the enrollment process. The claimant target can also be a biometric input that has been associated with the user ID, such as a scan of a fingerprint. A biometric input can be indistinguishable from a biometric response (e.g., both can be an iris scan), but are referred to herein by separate terms to distinguish between their uses in the various methods. In other words, a biometric input is used as a claimant target to indicate the identity sought to be authenticated, while a biometric response is provided in response to a prompt sent from the authentication system to authenticate the claimant.

In those instances where the claimant target is a string of alphanumeric characters, an e-mail address, or the like, the device 120 can comprise a keypad, keyboard, touch-sensitive screen, or the like on which the claimant target can be entered. Where the claimant target is a biometric input, the device 120 can comprise a camera capable of taking still images and/or providing video images. The device 120 can also include other biometric entry devices such as a touch pad for recording signatures, an iris scanner, a fingerprint reader, and so forth. Biometric inputs and responses are discussed in greater detail below.

It should be noted that in some instances the claimant sends the claimant target from the device 120, while in other instances another party to the transaction, such as a merchant, a financial institution, or another individual provides the claimant target to the authentication system 110. In the former situation the device 120 may be a device in the claimant's home, such as a PC, interactive TV system, gaming console, or the like, or a hand-held device that the claimant carries, such as a smart phone or PDA. The claimant can also send the claimant target from a device 120 such as a kiosk or a terminal in a retail store, for example.

In the latter situation, where the other party sends the claimant target, the claimant target can be sent from a device that is physically remote from the claimant, such as a web server (this is sometimes referred to as a Cardholder-Not-Present (CNP) transaction environment). In some of these embodiments, the remote device stores the claimant target (e.g., an on-line retailer can store the claimant targets of registered shoppers for their convenience) or receives the claimant target from the claimant at the beginning of the authentication process. In still other embodiments, the remote device can be a surveillance station, such as a closed-circuit TV (CCTV) camera, that sends a video feed to the authentication system 110. The video feed includes images of faces of people, and those images constitute claimant targets. As one example, a store can monitor people entering through a door and begin the authentication process for quicker and easier checkout.

The device 120 is additionally something the enrolled user possesses, or at least has ready access to. The device 120 is something that is unique to the user in as much as the device 120 is characterized by a unique device address such as a phone number, IP address, URL, e-mail address, etc. In various embodiments, the device 120 is able to receive and render a prompt from the authentication system 110 and/or transmit a response thereto. The prompt can be provided by the device 120 visually, aurally, or in combination, for example. For instance, the prompt can be displayed as a text message, a verbal command or cue, an audio clip, a video clip, etc. In some instances, the device 120 can be used by the claimant to provide the biometric response to the authentication system 110. Towards this end, the device 120 can include a camera capable of taking still images and/or providing video images. The device 120 may also include other biometric entry devices such as the ones noted above.

It should be appreciated that the use of still images or video images as the biometric response for authentication purposes provides a powerful security feature, in some embodiments. In particular, part of the prevalence of identity theft and electronic fraud lies in the anonymity associated with electronic transactions. It is a very strong deterrent to such malfeasance, however, to have to expose one's face to surveillance in order to perpetrate the fraudulent activity. With the advent of readily available and inexpensive webcams and cameras on cell phones, for example, the widespread implementation of a system that employs video for biometric responses becomes practical.

The communication channel 130 extends between the authentication system 110 and the device 120. The communication channel 130 can be fully duplexed and can comprise connections made through networks such as the network represented generally by a cloud 140 in FIGS. 1-3, such as the public switched telephone network (PSTN), wireless telephone networks, the Internet, wide area networks (WANs) and local area networks (LANs). It should be noted that although the communication channel 130 is represented in FIGS. 1-3 as connecting through only one such cloud 140, the communication channel 130 can comprise a connection through more than one network.

It will also be understood that the authentication system 110 can comprise further channels to facilitate communications with other parties to a transaction with a claimant. As described more fully below, a merchant may request an authentication over a second channel (not shown), the authentication then proceeds over the communication channel 130 between the claimant and the authentication system 110, and then confirmation of the authentication is sent to the merchant over the second channel.

Figure 4:
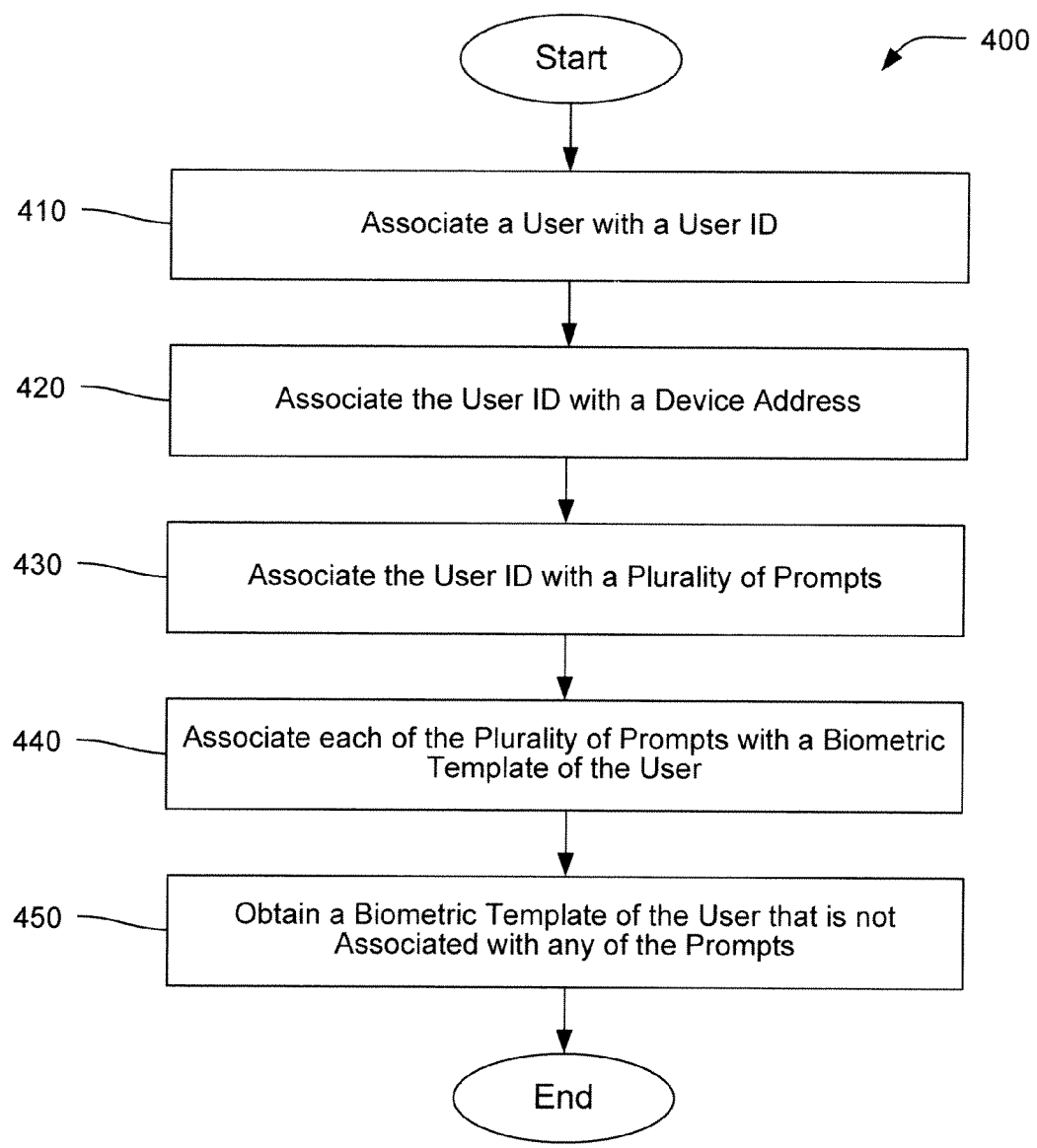
FIG. 4 is a flow-chart representation of an enrollment method according to an exemplary embodiment.

FIG. 4 illustrates an exemplary method 400 for enrolling a user. The method 400 comprises a step 410 of associating a user with a user ID, a step 420 of associating the user ID with a device address, a step 430 of associating the user ID with a plurality of prompts, and a step 440 of associating each of the plurality of prompts with a biometric template or signature of the user. The method 400 can also comprise, in some embodiments, a step of obtaining a biometric template of the user that is not associated with any of the prompts. The method 400 can be implemented, in some embodiments, by communicating with an enrollee user through a kiosk or over the Internet.

In the step 410, the enrollee user is associated with a user ID. This can comprise, for example, assigning a unique numeric or alphanumeric code to the user, or having the user select a unique numeric or alphanumeric code. In some embodiments a password is optionally assigned to, or selected by, the user as an additional security feature. The user ID can also be, in some instances, a biometric template. For example, a file containing a list of features extracted from the user's fingerprint (i.e., a fingerprint template) is one such possible user ID. In some embodiments more than one user ID is associated with the user so that the user can seek authentication multiple ways, such as by entering a code or presenting a finger to a scanner, for example. Step 410 can further comprise providing the user with a token including the user ID, such as a magnetic swipe card, a fob, an RFID tag, etc.

As described in the subsequent steps of the method 400, the user ID is further associated with additional information pertaining to the enrollee user. The user ID and such further information can be stored as records in relational databases, or in other data storage configurations, for later retrieval during an authentication. In addition to the information described below in steps 410-450, other information that can be associated with the user ID through the enrollment method 400 includes addresses, spending limits, access levels, and other third party management information system attributes. Such additional information can be stored locally, or can constitute a link or pointer to a record in an external database.

In an optional step 420 a device address is associated with the user ID. The device address is unique to a communication device that the user has, or has ready access to, such as the device 120 (FIG. 1). Step 420 can include receiving the device address from the user, for example, where the user enters the device address into a text box in an on-line enrollment form. In some embodiments, receiving the device address from the user comprises reading the device address directly from the communication device. In some instances, where the user has more than one communication device, a device address for each can be associated with the user ID.

The user ID is further associated with a plurality of prompts in step 430. The prompts can include common prompts such as "Say your mother's maiden name," and "Sign your name on the signature pad." In some embodiments, the user selects some or all of the plurality of prompts from a list of predefined prompts such as the common prompts noted above. The prompts selected by the user are then associated with the user ID. In other embodiments, a plurality of predefined prompts is automatically assigned to the user. In some embodiments, still other prompts that can be associated with the user ID are personalized prompts. As used herein, a personalized prompt is a prompt created by the user, for example, "Say the rhyme your daughter loves." The personalized prompts can be recorded in the user's own voice, or entered as text, for example. The number of prompts in the plurality of prompts can be two or more, but preferably is a number that strikes a balance between the security offered by greater numbers of prompts and the burden on the user to enroll large numbers of prompts and associated responses. In some embodiments, the number of prompts is 5, 6, 7, 8, 9, or 10 at the time of enrollment, and may be increased subsequently.

It should be appreciated that the use of a personalized prompt for authentication purposes provides a powerful security feature, in some embodiments. In particular, part of the prevalence of identity theft and electronic fraud lies in the availability of information through contracts and electronic databases. Prompts including questions such as "what is your mother's maiden name?" and "what is the name of your youngest sibling?" are easily discovered through contracts or Internet searches. A personalized prompt such as "color of my teenage dream car" is not readily known and whose response cannot be easily identified even by a spouse. With the increase in identity theft and a significant part of identity theft being perpetrated by family members, personalized prompts present a significant hurdle for even a person's closest associates.

In step 440 each of the plurality of prompts is associated with a biometric template of the enrollee user. For example, where the prompt is an instruction to say some word or phrase, the biometric template can be a voice template derived from the user saying the word or phrase. Here, associating the prompt with the biometric template can include providing the prompt to the user and receiving audio data (e.g., a .wav file) of the user's response. Associating the prompt with the biometric template can further include, in some instances, processing the received audio data to extract the biometric template. The biometric template can be, in some embodiments, a filtered or enhanced version of the originally received audio data, such as with background noise removed, or averaged over multiple repetitions by the user. The biometric template can also include a set of markers or values derived from the audio data.

Other examples of biometric templates include fingerprint templates derived from users' fingerprints; signature templates derived from users' signatures, and in some instances also derived from aspects of the act of creating the signature such as rate and pressure of the writing implement as a function of time; facial recognition templates derived from still or video images of users' faces; iris scan templates derived from users' iris scans; and so forth. A biometric template can also comprise an unprocessed biometric response, such as a .wav file of the user's voice, a .jpg file of an image of the user's face, etc.

It will be appreciated that the biometric template associated with any particular prompt need not make sense to anyone other than the user, adding still another security feature in some cases. For example, the user can create the prompt "Monday morning" and associate with that prompt a biometric template derived from saying "marvelous marigolds." Even if someone were to sample enough of the user's voice to reasonably model the user's voice, it would be virtually impossible to know the correct response to the particular prompt.

In some embodiments step 440 includes the use of voice recognition. Voice recognition is distinguished here from voice identification in that voice recognition can distinguish spoken words independent of the speaker, whereas voice identification associates the individual with the acoustics of the phrase without regard for the meaning of the words spoken. Thus, for instance, a user can create a personalized prompt by saying a phrase and then voice recognition can be employed by the authentication system to extract the phrase from a recording of the user saying the phrase. The extracted phase can then be stored as the biometric template, as a component of the biometric template, or as a completely separate record.

Step 450 is an optional step that comprises obtaining a biometric template of the user that is not associated with any of the prompts. For example, enrolling the user can comprise capturing a digital image of the user's face. The image can be associated with the user ID but not with any particular prompt. Should the user have problems with a subsequent authentication and end up speaking with a live operator, provided that the communication with the live operator is over a video conference or something similar, then the operator can compare the stored digital image of the user's face with the image of the claimant. Additionally, method 400 can optionally comprise associating additional user information with the user ID. Examples of additional user information include home address, home phone number, credit card numbers, system preferences and user settings, and so forth.

Figure 5:
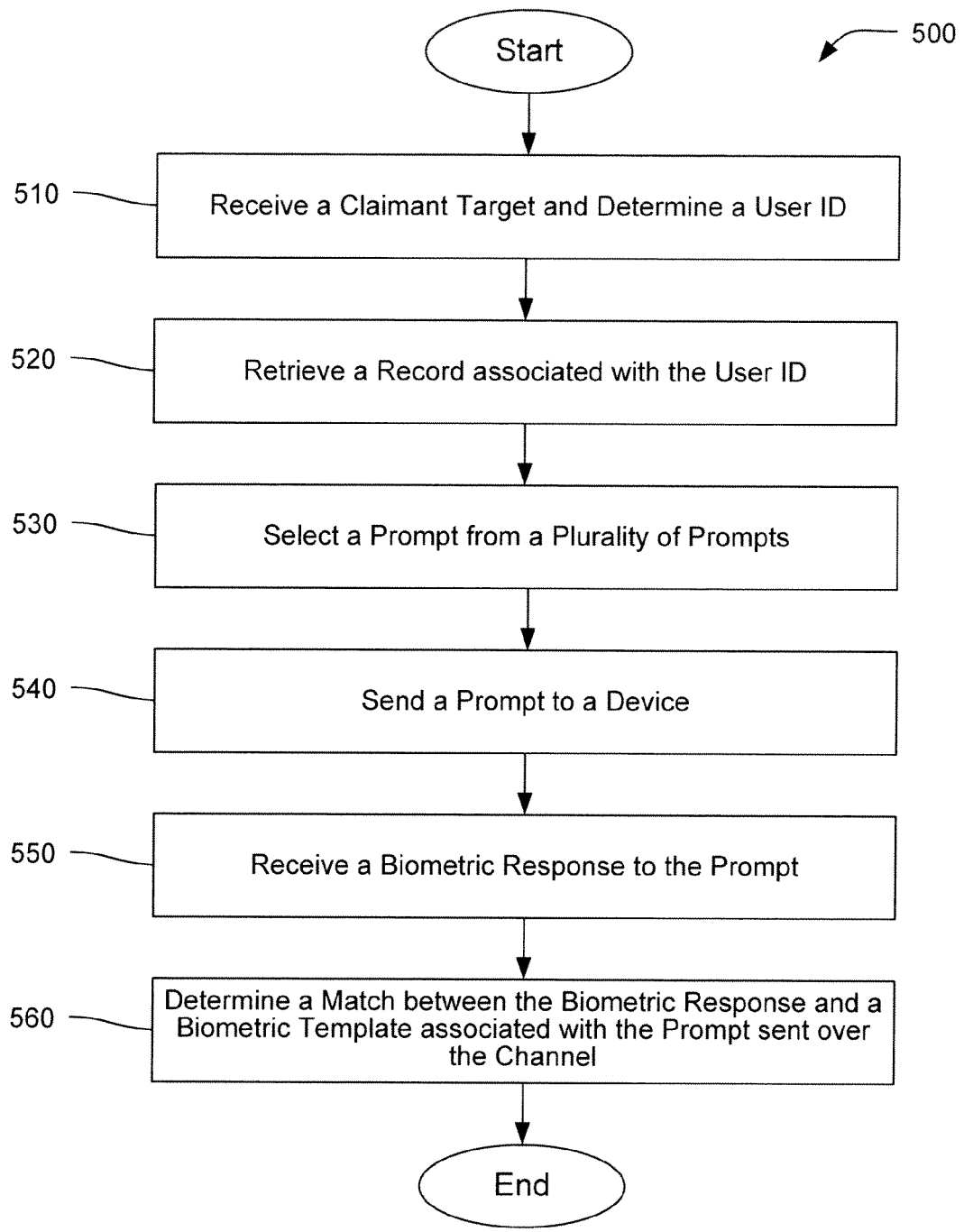
FIG. 5 is a flow-chart representation of an exemplary authentication method according to an exemplary embodiment.

FIG. 5 illustrates an exemplary method 500 for authenticating a claimant. The method 500 comprises a step 510 of receiving a claimant target and determining a user ID, an optional step 520 of retrieving a device address associated with the user ID, an optional step 530 of selecting a prompt from a plurality of prompts where each of the plurality of prompts is associated with a biometric template of a user, and a step 540 of sending a prompt, such as the prompt selected in step 530, over a channel to a device. The method 500 further comprises a step 550 of receiving a biometric response to the prompt, and a step 560 of determining a match between the biometric response and a biometric template associated with the prompt.

In step 510 a claimant target is received. In some embodiments, the claimant target is received over a communication channel from the device that the prompt is later sent to in step 540. In other embodiments, the claimant target is received from another party, such as a merchant, over a different communication channel. In some embodiments the claimant target comprises a user ID, while in other embodiments the method 500 further comprises determining the user ID from the claimant target. In some embodiments where the claimant target comprises the user ID, the user ID can be a numeric or alphanumeric character string, for example, such as an e-mail address or a user name selected by an enrollee user during the enrollment method 400 (FIG. 4). In other embodiments where the claimant target comprises the user ID, the user ID is a template such as a fingerprint template or an iris scan template. As one example, a fingerprint scanner on a kiosk scans the claimant's fingerprint, reduces the scan to a fingerprint template, and then sends the template to the authentication system which receives the template as the claimant target.

As note previously, in some instances the claimant target is not the user ID itself, and in these embodiments the method 500 further comprises determining the user ID from the claimant target. Returning to the prior example of the claimant at the kiosk, the kiosk could instead transmit to the authentication system the scan of the fingerprint without further processing. Here, the authentication system would further determine the user ID from the claimant target by reducing the scan to the fingerprint template.

In some embodiments, step 510 also comprises receiving an authentication request, which in some embodiments precedes receiving the user ID and in some embodiments includes the user ID. For example, a claimant seeking to complete a transaction with another party can send an authentication request including her user ID to the authentication system. Similarly, the authentication request, including the user ID, may come from another party, such as a merchant. In still other embodiments, either the claimant or the other party to the transaction can make the request for authentication and subsequently the claimant is prompted by the authentication system to submit the user ID. It should be noted that in some embodiments that claimant also supplies a password with the user ID, while in other embodiments a password is not required. Thus, in these latter embodiments, step 510 specifically does not comprise receiving a password.

After step 510, a record associated with the user ID is retrieved in step 520. The record can be retrieved, for example, from a database that associates information such as prompts, biometric templates, and device addresses with user IDs.

In optional step 530 a prompt is selected from a plurality of prompts, where each of the plurality of prompts has a biometric template of the claimant associated therewith. In some embodiments, the plurality of prompts is ordered, say from first to last, and the act of selecting the prompt simply comprises identifying the next prompt in the order based on the last prompt used. Other embodiments employ randomization algorithms. A rule can be implemented, in some embodiments, that the same prompt from the plurality of prompts cannot be used in successive authentications. Similar rules can be implemented to prevent the same prompt from being employed twice within any three authentications, and so forth. Yet another rule that can be implemented applies where several of the biometric templates each include voice data comprising at least two syllables. Here, the rule requires that the same two syllables used in one authentication cannot be used in the next subsequent authentication.

In step 540, a prompt is sent over a communication channel to a device. Where the claimant target was originally received from the device 120, the prompt is sent in step 540 over the same communication channel 130. Otherwise, where the claimant target was originally received from a device other than device 120 (FIG. 1), a device address stored in the record that was retrieved in step 520 can be used to establish the communication channel 130 to the device 120. The prompt is then sent over the communication channel 130 to the device 120.

In the limiting case where there is only a single prompt associated with the user ID, for example, the step 530 of selecting a prompt from a plurality of prompts is unnecessary and step 540 simply comprises sending the one prompt. Where the prompt is selected in step 530 from a plurality of prompts, step 540 comprises sending the selected prompt. In some instances, the prompt is sent in a text message according to the Short Message Service (SMS) communications protocol. In other embodiments, the prompt is delivered as a voice transmission such as an audio recording or as synthesized speech. The prompt can similarly comprise a video transmission. The prompt can also be sent as an e-mail or an Instant Message.

In some embodiments, the prompt is obscured, for example, according to a method such as that performed by a CAPTCHA (Completely Automated Turing Test to Tell Computers and Humans Apart) program. When a CAPTCHA program is applied to an audio or a video prompt, audio or video interference or noise is superimposed onto the prompt to make it more difficult for a machine to recognize the prompt, while a human will still be able to discern the prompt. In additional embodiments, step 540 includes employing a text-based CAPTCHA before the selected prompt is sent.

It should be noted that instructions, in addition to the prompt, can also be sent to the claimant over the communication channel. As one example, the claimant submits a claimant target from her PC and receives a prompt in response. An instruction can also be sent over the channel to be displayed on the PC such as "A prompt has been sent to you. After the red light appears on your screen, face the webcam and provide your response to the prompt."

After step 540, a claimant receives the prompt and acts accordingly to produce some biometric response. For example, the claimant can speak to a microphone, present her face or another body part to a camera, make a gesture in front of a camera, press her finger on a fingerprint scanner, present her eye to a retinal scanner, write on a touch-sensitive pad, or combinations of these. The biometric response is therefore some product of the claimant's actions such as a voice data, a fingerprint scan, retinal scan, or an image of the person's face or body part, for example. The biometric response can comprise unprocessed data, partially processed data, or can be completely reduced to a template, for example. The method 500 further comprises the step 550 of receiving the biometric response to the prompt. Here, the biometric response is received over the communication channel from the same device that received the prompt.

Step 560 comprises determining a match between the biometric response and a biometric template associated with the prompt. In a simple example, the biometric template comprises a facial recognition template of a user and the biometric response comprises a segment of streaming video that includes frames showing the claimant's face. Here, determining the match comprises extracting a facial recognition template of the claimant's face from the frames of the video segment and comparing that facial recognition template to the original facial recognition template of the user.

It will be appreciated, moreover, that step 560 can comprise matching more than one biometric template to the biometric response. For instance, in the above example, the segment of streaming video can also include the claimant saying a phrase. Here, a voice template can be extracted in addition to extracting a facial recognition template. In this example a match can be determined between a voice template and the voice in the video, and a match can be determined between a face template and the face in the video.

In various embodiments, determining the match between the biometric response and the biometric signature comprises determining a figure of merit that characterizes the agreement between the biometric response and the biometric template, and then comparing that figure of merit to a threshold. If the figure of merit exceeds the threshold, or in some instances equals or exceeds the threshold, then the match has been determined. Where more than one biometric template is compared to the biometric response, in some embodiments, a figure of merit for each biometric template is calculated and each figure of merit is compared to the relevant threshold.

In those embodiments where the biometric response comprises a vocal response from the claimant, determining the match between the biometric response and the biometric template in step 560 can comprise performing voice recognition on the biometric response to determine whether the correct word or words were spoken. Voice recognition has the benefit of being less computationally intensive than voice identification, therefore, a useful screen can be to employ voice recognition to determine whether the correct word or words are present in a biometric response.

If the match cannot be determined, an optional step of the method 500 comprises repeating method 500 beginning at step 520, preferably by selecting a different prompt in step 530 than in the previous iteration. Another optional step if the match cannot be determined comprises establishing a live interview between the claimant and a customer service representative. The customer service representative, in some instances, has the authority to authenticate the claimant based on the interview. As noted previously, the customer service representative may be able to employ biometric templates that are not associated with any of the prompts to decide whether to authenticate the claimant.

Figure 6:
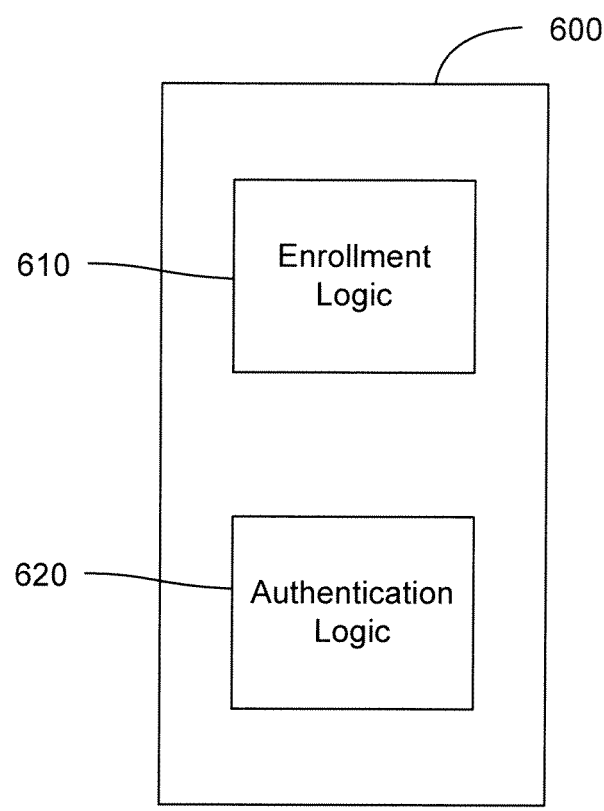
FIG. 6 is a schematic representation of an authentication system according to an exemplary embodiment.

FIG. 6 shows an exemplary embodiment 600 of the authentication system 110 (FIG. 1). The authentication system 600 of FIG. 6 comprises logic 610 configured to enroll users and logic 620 configured to authenticate claimants. In various embodiments, logic 610 and 620 each can comprise hardware, firmware, software stored on a computer readable medium, or combinations thereof. Logic 610, 620 may include a computing system such as an integrated circuit, a microprocessor, a personal computer, server, distributed computing system, communication device, network device, or the like. For example, logic 610 and 620 can be implemented by separate software modules executed on a common server. In other embodiments, logic 610 and 620 can be implemented on different computing systems. Logic 610 and 620 can also be at least partially integrated together.

In some embodiments, logic 610 and 620 can be implemented by means programmed to perform specific method steps, such as means programmed to associate a plurality of biometric templates each with one of a plurality of prompts, means programmed to select a prompt, means programmed to send a prompt, means programmed to determining a match between a biometric response and a biometric template, means programmed to perform voice recognition, means programmed to perform voice identification, and so forth.

The authentication system 600 can also comprise, as part of the logic 610, 620 or separate therefrom, volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing digital or analog information. Logic 610 can comprise, for instance, volatile and/or non-volatile memory as the computer readable medium on which software is stored for performing the methods described herein. Other volatile and/or non-volatile memory can comprise databases or other means for maintaining information about enrolled users. Such information can be created and revised by logic 620 and accessed by logic 610.

The authentication system 600 can also comprise communications logic that allows the logic 610 and 620 to communicate, for example, with the device 120 (FIG. 1) over the communication channel 130 (FIG. 1). In some embodiments the communications logic allows the logic 620 to interface with multiple devices in parallel to support the simultaneous enrollment of multiple users. At the same time, the communications logic allows the logic 610 to independently interface with multiple other devices to support the simultaneous authentication of multiple claimants.

The enrollment logic 610 is configured to enroll a user by performing an enrollment method such as method 400 (FIG. 4). In an exemplary embodiment, the enrollment logic 610 is configured to associate the user with a user ID, associate the user ID and with a device address, associate a plurality of prompts with the user ID, and associate a number of biometric templates each with one of the plurality of prompts. The enrollment logic 610, in some embodiments, is configured to associate the plurality of prompts with the user ID by presenting a set of pre-defined prompts to the user and receiving a selection of the plurality of prompts from the set. In additional embodiments, the enrollment logic 610 is further configured to allow the user to create a personalized prompt. The enrollment logic 610 can also comprise a computer readable medium that stores software instructions for performing these steps.

The authentication logic 620 is configured to authenticate a claimant by performing an authentication method such as method 500 (FIG. 5). In an exemplary embodiment, the authentication logic 620 is configured to receive a claimant target, retrieve a device address associated with a user ID, send a prompt from the plurality of prompts over a channel to a device associated with the device address, receive a biometric response to the prompt, and determine a match between the biometric response and a biometric template associated with the prompt. In some embodiments the claimant target comprises the user ID, while in other embodiments the authentication logic is further configured to determine the user ID from the claimant target. The authentication logic is further configured to send a key, in some instances, where the key can be used for encryption and/or creating a watermark. In some of these embodiments the prompt includes the key when sent. In some embodiments, keys expire within a period of time, such as 30 seconds, after being issued. Encryption and watermarking are described in greater detail below. The authentication logic 620 can also comprise a computer readable medium that stores software instructions for performing these steps.

Figure 7:
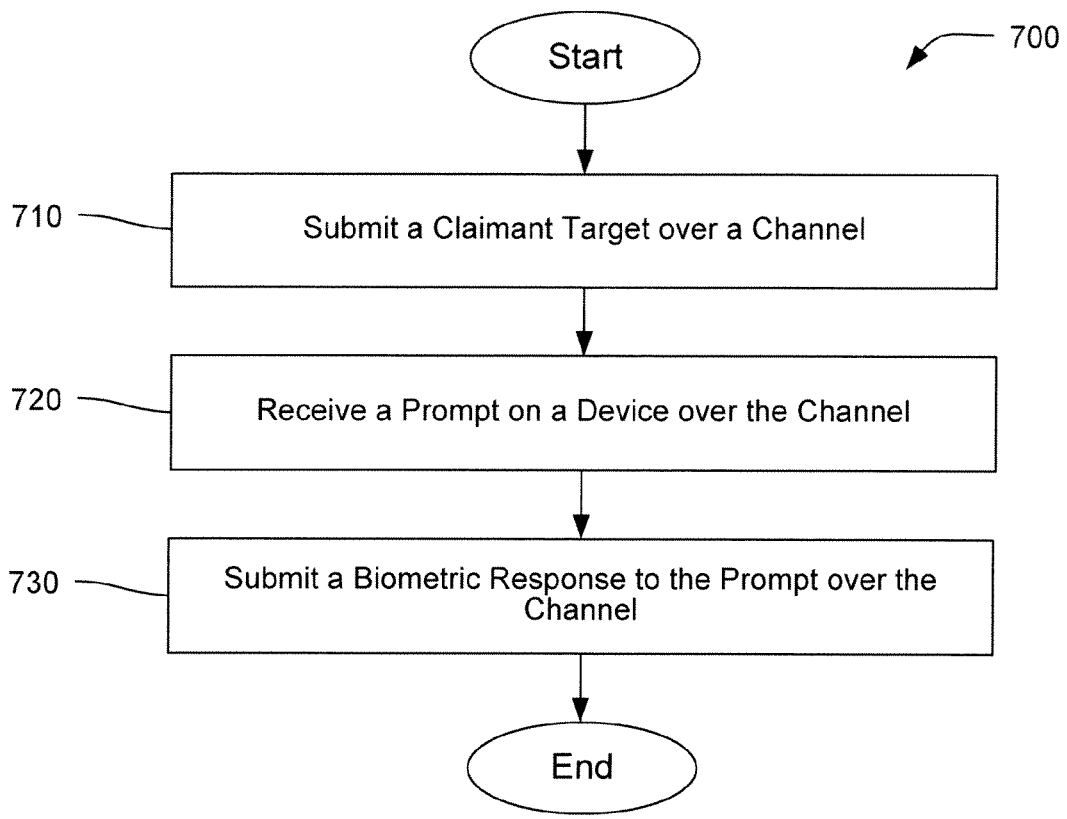
FIG. 7 is a flow-chart representation of an exemplary method for a claimant to be authenticated according to an exemplary embodiment.

FIG. 7 shows an exemplary authentication method 700 that can be performed, for example, by a claimant. The method 700 comprises a step 710 of submitting a claimant target over a channel, a step 720 of receiving a prompt on a device over the channel, and a step 730 of submitting a biometric response to the prompt over the channel. In some embodiments, the claimant performing the method 700 only has to perform these three steps to be authenticated.

In step 710, the claimant submits the claimant target, such as the user ID, to an authentication system. Since the method 700 can be performed by a claimant seeking to complete an electronic transaction from home, work, or in public, in step 710 the claimant can submit the claimant target from a PC at home, from a kiosk in a shopping mall, or from at a terminal at a store check-out, for example. The claimant can submit the claimant target, according to various embodiments, by entering numbers and/or letters with a keyboard or keypad, swiping a magnetic card through a card reader, bringing an RFID tag within range of an RFID reader, writing with a stylus on a touch-sensitive pad, placing a finger on a fingerprint reader, speaking within range of a microphone, smiling for a camera, combinations thereof, and so forth.

Then, in step 720, the claimant receives a prompt on the device that was used to submit the claimant target. As previously noted, examples of the prompt include a text message, e-mail, an Instant Message, an audio recording, a video, or synthesized speech. As noted above, to make the prompt difficult for a machine to parse, the prompt can be obscured, for example, through the use of a CAPTCHA program so that human intelligence is required to discern the prompt. Next, in step 730, the claimant submits a biometric response to the prompt over the same communication channel from the device to the authentication system. The claimant can submit the biometric response, according to various embodiments, by writing with a stylus on a touch-sensitive pad, placing a finger on a fingerprint reader, placing one eye in proximity to an iris scanner, speaking within range of a microphone, speaking to a camera, combinations thereof, and so forth.

Additional security features that can be incorporated are further described below. For example, any of the electronic communications described herein can be encrypted according to well known encryption protocols. As another example, a watermark can be added to any biometric response sent to the authentication system.

A still further security feature is achieved through hybrid prompts. A hybrid prompt is a prompt that the user selected during enrollment that is modified during authentication. For instance, the user during enrollment selects the prompt "Say your favorite movie." Subsequently, during authentication, the claimant receives the hybrid prompt "Say you favorite movie, then say spark plug." Here, the original prompt has been modified to also ask for random words or a random phrase. Voice recognition can then be employed to determine whether the words added to the original prompt were spoken in the biometric response. If so, voice identification can be applied to the portion of the biometric response that includes the response to the original prompt. Furthermore, that portion of the biometric response that includes the added random words can be saved as further biometric templates from the user.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method for authenticating a user comprising:
   receiving a claimant target;
   retrieving an IP address associated with a user ID and establishing a communication channel using the IP address;
   sending a prompt over the communication channel, the prompt being one of a plurality of prompts, each of the plurality of prompts having a biometric template of the user associated therewith;
   receiving a biometric response to the prompt over the communication channel; and
   determining a match between the biometric response and a biometric template associated with the prompt.

2. The method of claim 1 wherein the claimant target comprises a user ID.

3. The method of claim 1 further comprising determining a user ID from the claimant target.

4. The method of claim 1 not comprising receiving a password.

5. The method of claim 1 wherein the claimant target is received over the communication channel.

6. The method of claim 1 wherein at least one of the prompts of the plurality of prompts comprises a personalized prompt.

7. The method of claim 1 wherein the prompt comprises a hybrid prompt including a random word.

8. The method of claim 7 further comprising applying voice recognition to the random word.

9. The method of claim 8 further comprising storing a biometric signature corresponding to the random word.

10. The method of claim 1 further comprising selecting the prompt from the plurality of prompts.

11. The method of claim 10 wherein selecting the prompt is performed according to a rule that the same prompt is not used in successive authentications.

12. The method of claim 1 wherein the prompt is obscured.

13. The method of claim 12 wherein the prompt is obscured through the application of a CAPTCHA program.

14. The method of claim 1 wherein the prompt comprises a hybrid prompt including a random word.

15. The method of claim 14 further comprising applying voice recognition to the random word.

16. The method of claim 15 further comprising storing a biometric signature corresponding to the random word.

17. The method of claim 1 further comprising sending a key that expires within a period of time.

18. The method of claim 17 wherein the key is included in the prompt.

19. A method for authenticating a user comprising:
    receiving a claimant target;
    retrieving a phone number associated with a user ID and establishing a communication channel using the phone number;
    sending a prompt over the communication channel, the prompt being one of a plurality of prompts, each of the plurality of prompts having a biometric template of the user associated therewith;
    receiving a biometric response to the prompt over the communication channel; and
    determining a match between the biometric response and a biometric template associated with the prompt.

20. The method of claim 19 further comprising determining a user ID from the claimant target.

21. The method of claim 19 not comprising receiving a password.

22. The method of claim 19 wherein at least one of the prompts of the plurality of prompts comprises a personalized prompt.

23. The method of claim 19 wherein sending the prompt includes sending a SMS.

* * * * *